United States Patent [19]

Vranish

[11] Patent Number: 5,358,460

[45] Date of Patent: Oct. 25, 1994

[54] FLEX-GEAR POWER TRANSMISSION SYSTEM FOR TRANSMITTING EMF BETWEEN SUN AND RING GEARS

[75] Inventor: John M. Vranish, Crofton, Md.

[73] Assignee: The United States of America as represented by the Administrator of the National Aeronautics and Space Administration, Washington, D.C.

[21] Appl. No.: 8,424

[22] Filed: Jan. 25, 1993

[51] Int. Cl.5 ............................................. F16H 57/00
[52] U.S. Cl. .................................... 475/344; 475/149; 475/345; 74/411
[58] Field of Search ............... 475/149, 152, 331, 344, 475/345, 346, 347; 74/409, 411

[56] References Cited

U.S. PATENT DOCUMENTS

| 2,427,583 | 9/1947 | von Mertens | 475/345 X |
| 3,081,648 | 3/1963 | Duer | 475/345 |
| 3,116,651 | 1/1964 | Hardy | 475/344 |
| 3,322,984 | 5/1967 | Anderson | 475/149 X |
| 3,946,410 | 3/1976 | Maida | 354/173 |
| 4,420,199 | 12/1983 | Vis et al. | 901/49 |
| 4,830,569 | 5/1989 | Jannborg | 901/38 X |
| 4,858,979 | 8/1989 | Parma | 901/38 X |
| 4,961,655 | 10/1990 | Saito | 400/171 |
| 4,969,371 | 11/1990 | Allen | 74/462 |
| 5,010,784 | 4/1991 | Nakazato et al. | 74/498 |

FOREIGN PATENT DOCUMENTS 507744 12/1919 France .................................. 475/149

*Primary Examiner*—Dirk Wright
*Assistant Examiner*—Khoi Q. Ta
*Attorney, Agent, or Firm*—Robert D. Marchant; Guy M. Miller

[57] ABSTRACT

A plurality of flexible cylindrical members, termed flex-gears and having gear tooth type perimeters are located in an annular space between two concentric rotating gear members, one an inner gear member and the other an outer ring gear member, both of which have mutually facing toothed surfaces which engage the flex-gears. The flex-gears rotate and orbit around the annular space as planetary gears when the inner and outer gear members rotate with respect to one another. Pairs of these elements located in two mutually parallel planes and separated by insulators provide two electrical conductor paths across which an electrical signal source, AC or DC, can be connected and coupled to an electrical device. Alternatively, one set of elements including outer gears segmented into mutually insulated semicircles and inner gears segmented into mutually insulated quadrants can be used.

10 Claims, 3 Drawing Sheets

FLEX-GEAR POWER TRANSMISSION SYSTEM FOR TRANSMITTING EMF BETWEEN SUN AND RING GEARS

ORIGIN OF THE INVENTION

This invention was made by an employee of the United States Government and therefore may be used by or for the Government for governmental purposes without the payment of any royalties thereon or therefor.

BACKGROUND OF THE INVENTION

1. Field of the Invention

This invention relates generally to devices for transmitting both electric and mechanical power across an interface and more particularly to an electromechanical type rotary joint including gear type coupling elements.

2. Description of the Prior Art

Means for coupling electrical current or power across an interface typically includes such apparatus as electrical cables and/or transformers. Where transmission of current and power are further required across a movable, i.e. rotatable mechanical interface, slip rings or roll rings have been typically employed.

Slip rings are devices which are well known and have been widely utilized in space and industrial applications. However, it is well known that they do not in principle have smooth electrical transfer characteristics because since they are based on a sliding, friction process, they tend to hop and skip slightly as the members move with respect to one another. This adversely affects the signal to noise ratio of the system. It also adversely affects wear and reliability. Furthermore, for high speed rotating members where many rotations are involved, particularly in a vacuum such as in outer space, the problems with slip rings become greatly exacerbated.

With respect to roll rings, they cannot be fixedly located between two rotating members separated by a gap type of interface, as they tend to wander as the joint members move relative to one another. Consequently, if one or more roll ring is used, they can easily bump into one another, which in turn causes spikes in the conducting current. As a result, either separating techniques must be used, which in the past have proven much more involved than they are worth, or only a single rolling disk is used in any one orbit. Additionally, roll rings can only carry current. They cannot be used to additionally act as a mechanical power transmission system.

In robotic applications where rotary joints are located, electrical power transmission typically use electrical cables and transformers. Cables, however, are much too bulky and heavy and do not permit continuous rotations. Also, they are subject to being snagged and tearing. In certain circumstances, it can degrade as a result of continuous flexing. In every instance, particularly at a robot wrist, the cable must be looped around the robot structure in such a way that it can permit the wrist to turn ±180°. Such arrangements are typically awkward, consume large amounts of space and are subject to snagging. With respect to transformers, such apparatus typically requires higher frequency AC power. Moreover, they are generally heavy and bulky. Furthermore, the coupling coils must be placed in close proximity to each other and this means extra precision in fabrication. Also there is generally significant electrical losses in the air gaps between the coils.

With respect to mechanical power transmission across robotic interfaces, state of the art anti-backlash gears have had wide utilization but do not include electrical transmission. Anti-backlash gears are normally comprised of pairs of counter rotating gears which are driven opposite each other and being intercoupled by a spring. This increases the size more than is desired and tends to be more complex and expensive than is necessary.

SUMMARY

It is an object of the present invention, therefore, to provide improved means for transferring electrical power across a rotary joint.

It is another object of the invention to provide a system which is capable of transferring DC as well as AC current across a rotary joint, with the current transfer being noise free and with relatively low losses.

And it is a further object of the invention to provide a relatively simple anti-backlash gear assembly that can transmit mechanical as well as electrical power across an interface.

It is still a further object of the invention to provide a system for transferring electrical current across a rotary joint interface in an outer space environment.

It is yet another object of the invention to transfer electrical power via a electromechanical rotary joint while generating minimum debris and contaminants under operation yet able to operate effectively despite the presence of such contaminants.

Briefly, the foregoing and other objects are achieved by inclusion of one or more flexible cylindrical members, termed flex-gears and having a gear tooth type perimeter, in a gap between two concentric rotating gear members, one an inner gear member and the other an outer ring gear member, both of which have mutually facing toothed surfaces which engage the flex-gears. The flex-gears rotate and orbit around the gap as planetary gears when the inner and outer gear members rotate with respect to one another. Pairs of these elements located in two mutually parallel planes and separated by insulators provide two electrical conductor paths across which an electrical signal source, AC or DC, can be connected and coupled to an electrical device. Alternatively, one set of elements including inner and outer gears which are segmented into mutually insulated quadrants can be used.

BRIEF DESCRIPTION OF THE DRAWINGS

The following detailed description of the invention will be more readily understood when considered in conjunction with the accompanying drawings wherein.

DETAILED DESCRIPTION OF THE INVENTION

Figure 1:
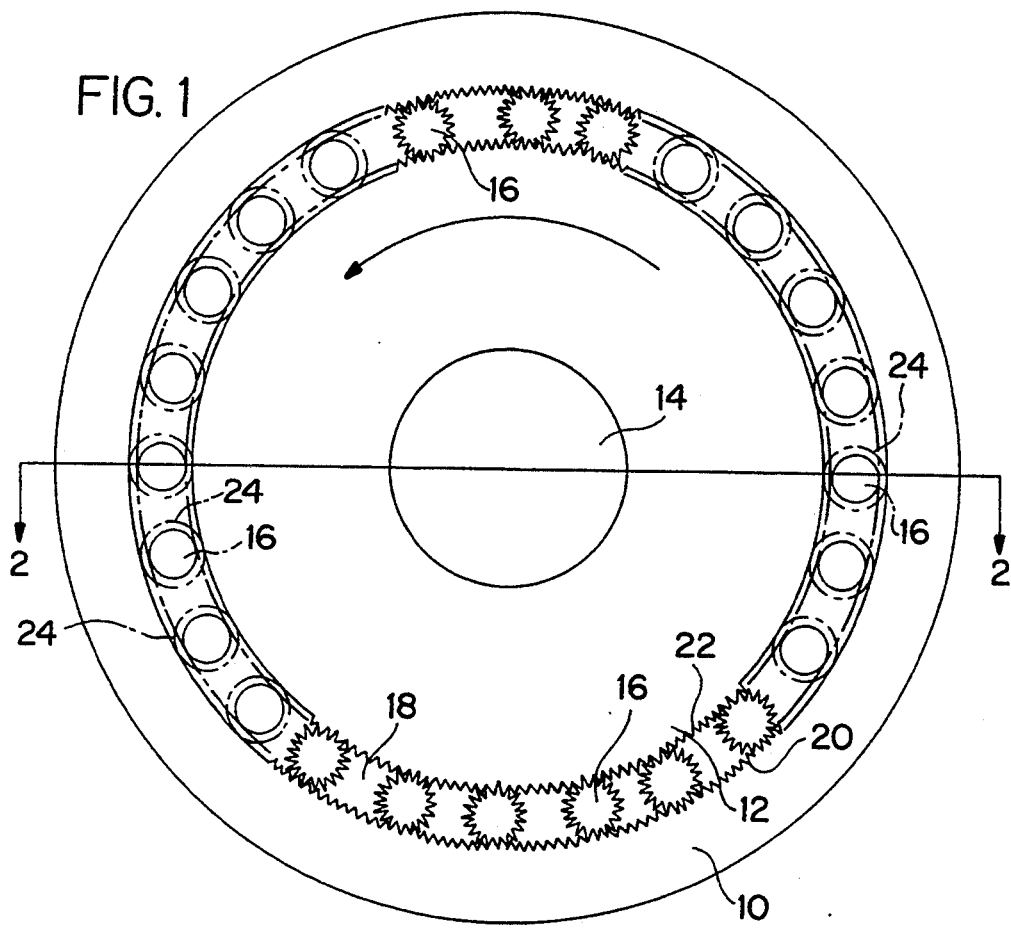
FIG. 1 is a top plan view of a preferred embodiment of the invention.

Referring now to the drawings wherein like reference numerals refer to like parts throughout, reference will first be made collectively to FIGS. 1–3 wherein there is disclosed a first embodiment of the invention. As shown in FIG. 1, the top level of a two level flex-gear system, and depicted in FIG. 2, includes two concentric and coplanar gear members, an outer gear member 10 and an inner gear member 12, the latter being coupled to a shaft 14. The outer gear member 10 comprises a ring gear, while the inner gear 12 comprises a circular gear for a plurality of planetary gear members 16 which are located in the annular space 18 between the gears 10 and 12 and which contact outer and inner sets of gear teeth 20 and 22.

Figure 3:
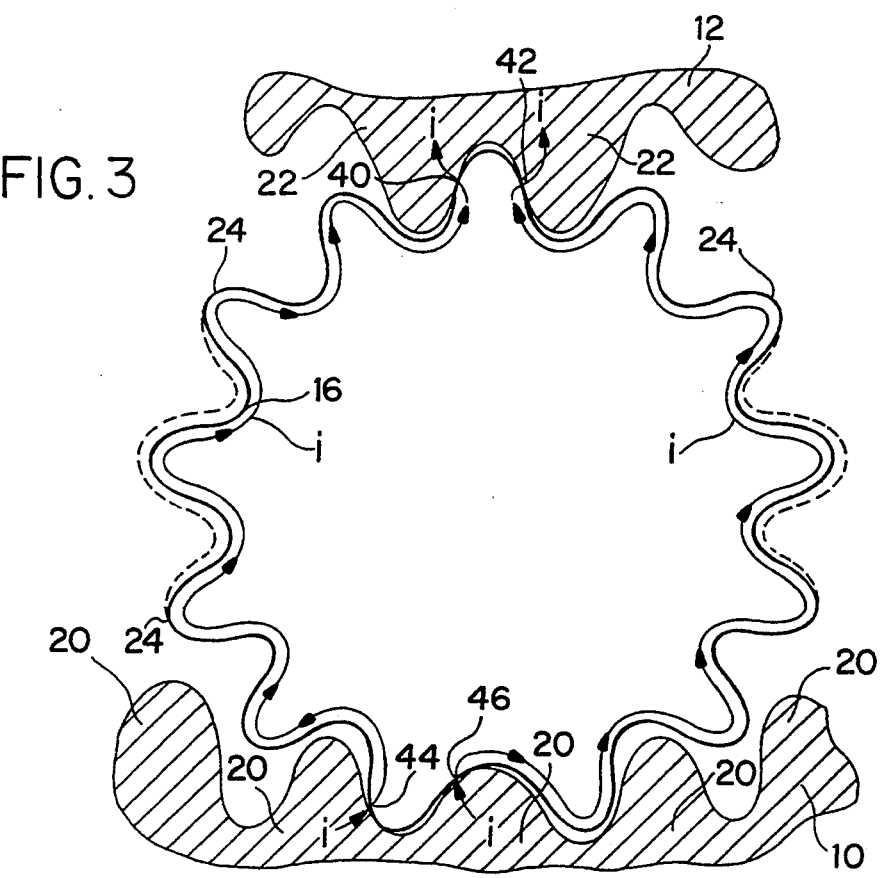
FIG. 3 is an enlarged fragmented sectional view of the embodiment shown in FIG. 1 further illustrating the details of one of the flexible geared cylinders or flex-gears included therein.

The planetary gear members 16 comprise flexible geared cylindrical members as shown in FIG. 3, and are typically fabricated from beryllium copper material which comprises a self-cleaning material which is preferred in electrical connectors used in outer space as well as on earth for its excellent current carrying characteristics. A typical example of a flex-gear member 16 includes thirteen teeth 24, an axial length of 0.25 inches, a cylindrical wall thickness of 0.004 inches and an average diameter of 0.25 inches.

Figure 4:
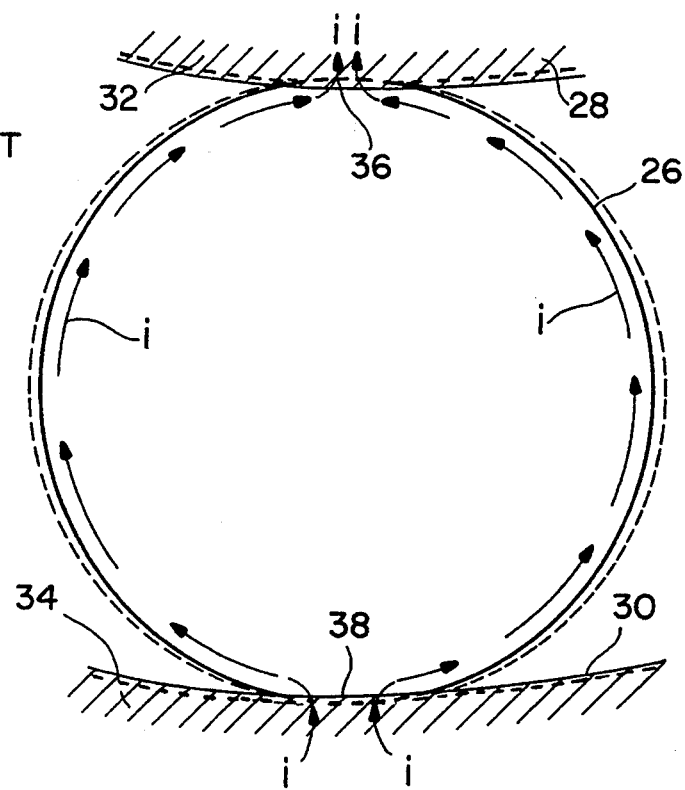
FIG. 4 is a top plan view typically illustrative of the details of a known prior art flex ring arrangement.

This is in contrast to a known prior art flex-roll ring as shown in FIG. 4 and comprising a circular flexible metal ring 26 which is located between and rides in respective grooves formed in opposing surfaces 28 and 30 of two rotating members 32 and 34 which define thereby a pair of mutually opposing contact areas 36 and 38.

As noted above, flex rings have certain inherent limitations, since they operate on a sliding frictional contact between the members 32 and 34 and have a tendency to hop and skip as the members 32 and 34 move with respect to one another.

The flex-gear members 16, on the other hand, being comprised of flexible geared cylinders are compressed slightly and inserted in the gap 18 where they rotate and translate around the gap 18 when the inner and outer gear members 10 and 12 are turned with respect to each other. The flex-gear member 16 being slightly compressed before insertion into the gap 18 between the two sets of gear teeth 20 and 22 maintain a continuous contact with both the outer and inner gear members 10 and 12. Moreover, since the flex-gear members are actually gears which mesh the gears 10 and 12, many can be packed into the gap 18 and they will all hold their respective positions during rotation of the inner and outer gears 10 and 12, even at high speeds. Moreover, being independently sprung, the flex-gear members 16 hold continuous contact with both the outer and inner gear members 10 and 12.

Further as shown in FIG. 3, one or two teeth 20 and 22 of the outer and inner gears 10 and 12 are engaged by the teeth 24 of the flex-gear 16 at each interface for an average of 1.7 contact surfaces at each interface or 3.4 counting both interfaces. A roll ring 26, on the other hand, such as shown in FIG. 4, has only one contact at each interface, or 2 altogether. An improved contact is provided by the flex-gears 16 because geared interfaces are provided which essentially provide a cylinder-in-socket condition. A larger contact area between the elements 10, 12 and 16 is thus provided. In FIG. 3, one pair of contact areas 40 and 42 exist at the meeting of one gear tooth 24 of the flex-gear 16 and two gear teeth 22 of the inner gear 12, while a second pair of contact areas 44 and 46 are provided by the lower gear tooth 24 of the flex-gear 16 and two adjacent gear teeth 20 of the outer gear 10.

Figure 2:
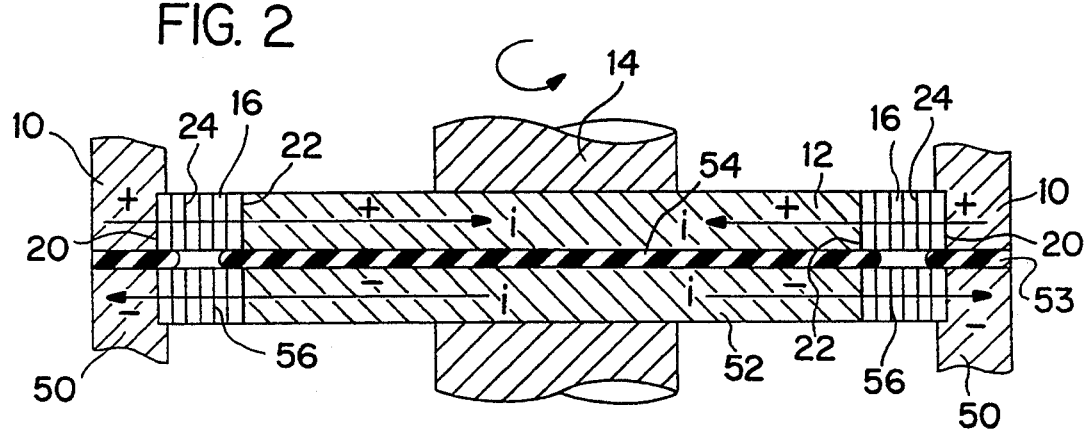
FIG. 2 is a central longitudinal cross sectional view of the embodiment shown in FIG. 1 taken along the lines 2—2 thereof.

The elements shown in FIG. 1 provide one electrical current path of a dual path system which is further implemented by the additional gear elements shown in FIG. 2. There a lower outer gear 50 and an inner gear 52 are separated from the upper gears 10 and 12 by flat insulation members 53 and 54. Again as in the top half of the system, a second set of flex-gears 56 are located in the space between the outer and inner gears 50 and 52. The upper and lower gear assemblies including respective sets of flex-gears 16 and 56, provide a closed power circuit where power can enter through the upper set of gear elements as indicated by the (+) sign and exit via the lower set of gear elements as shown by the (−) sign when electrical apparatus, not shown, is coupled thereacross and when attached, for example, to the insulator members 53 or 54. Such a system will pass either DC current or AC current and the current will be extremely clean i.e. devoid of transients. Also the system adjusts for dimensional expansion due to thermal variations and will wear substantially indefinitely while being extremely reliable and impossible to snag.

Figure 5:
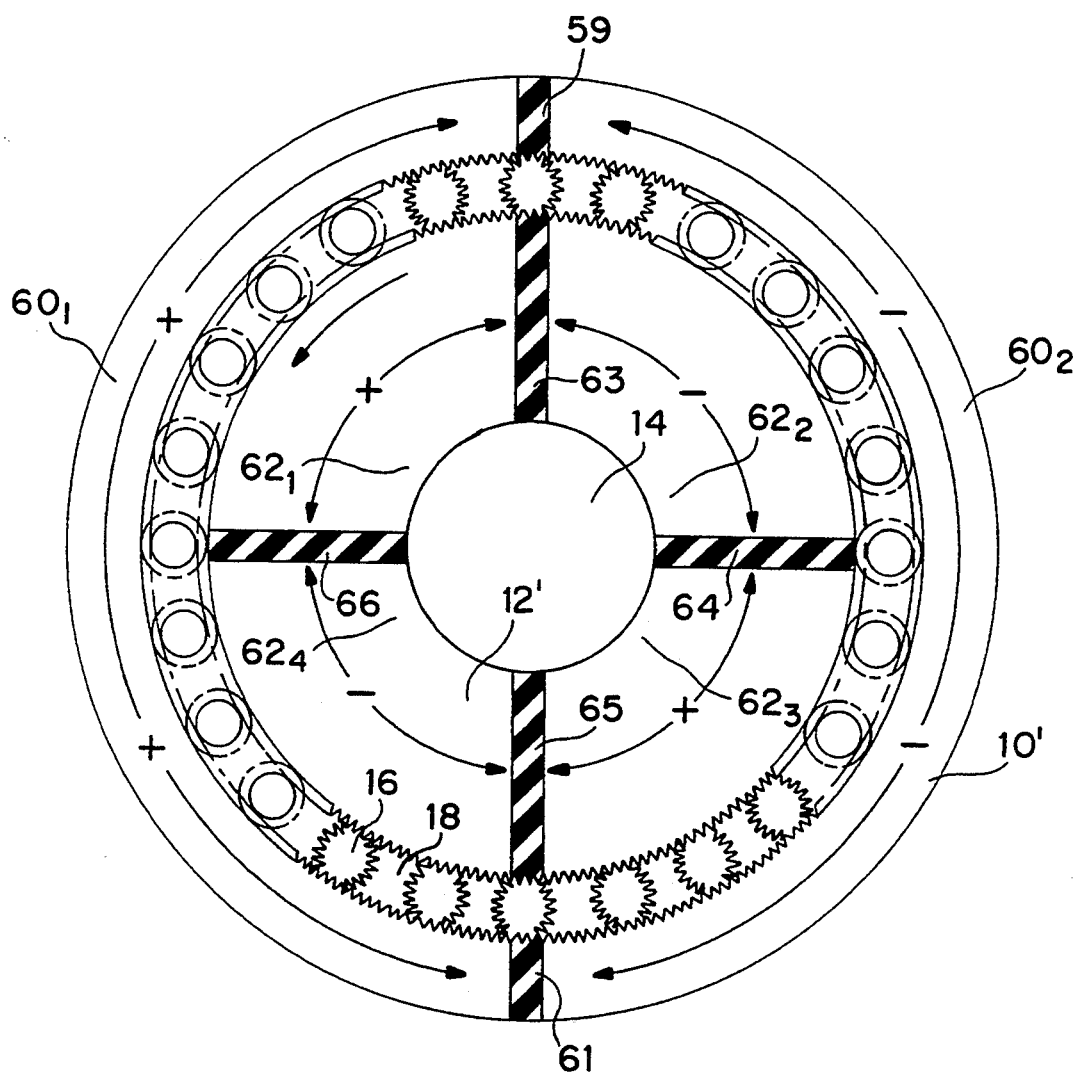
FIG. 5 is a top plan view illustrative of another preferred embodiment of the invention.

A variation of this concept is depicted in FIG. 5. There only a single layer of components is required. Referring now to FIG. 5, shown thereat is an outer ring gear member 10' comprised of two semi-circular gear segments $60_1$ and $60_2$ separated by insulator members 59 and 61 and inner gear member 12' comprised of four quadrature type segments $62_1$, $62_2$, $62_3$ and $62_4$ separated by insulator members 63, 64, 65 and 66.

Elements when assembled, as shown in FIG. 5, provide an annular space 18 into which a plurality of flex-gear members 16 are assembled. With the outer gear 10' being split into two sections $60_1$ and $60_2$ and oppositely poled, for example + and − respectively as shown, and with the inner gear 12' being separated into four sections $62_1$, $62_2$, $62_3$ and $62_4$, and where the sections were alternately poled + and − as shown, a minimum of ¼ of the flex-gears 16 will at all times be connected to the + polarity side, and ¼ of the flex-gears 16 will be connected to the − polarity side of the gear arrangement. Placing the proper and customary polarity circuit safety features permit current flow only in a desired direction, thus providing a massive current carrying capability between the outer and inner gear members through the flex-gear members 16.

Having thus shown two preferred embodiments of the invention, it will be recognized that certain advantages are achieved over the known prior art.

Exceptionally low resistance is provided by this invention which permits large currents to flow with relatively low noise. This is true because both the large number of flex-gears can be employed in a single compact orbit and because the current carrying capability of each flex-gear is fabricated from beryllium copper. Furthermore, the use of flex-gears permit an exceptionally compact mechanical arrangement to be realized. Also, the flex feature permits continuous contact between the flex-gears 16 and the contiguous outer and inner gear members 10, 12 and 10', 12' under all conditions while providing low contact pressure. Moreover, current can be carried at any frequency including DC. The flex-gears 16 will also properly track even at high rotational speeds. This will prove extremely important for applications involving coupling power to mutually rotating members of high speed motors. Finally, the flex-gears 16 in addition to having a current carrying capability also provide an anti-backlash gear feature providing a more compact and simpler gear system than the customary spring-loaded anti-backlash gears currently being used in conventional mechanical interface systems.

Having thus shown and described what is at present considered to be the preferred embodiments of the invention, it should be noted that the same has been made by way of illustration and not limitation. Accordingly, all modifications, alterations and changes coming within the spirit and scope of the invention are herein meant to be included.

I claim:

1. A gear system for providing both mechanical and electrical transfer of energy, comprising:
   an outer gear member having an inner toothed surface of a predetermined first diameter;
   an inner gear member concentric and substantially coplanar with said outer gear member and having an outer toothed surface of a predetermined second diameter,
   said first diameter being greater than said second whereby an annular space is generated between said toothed surfaces; and
   a plurality of planetary flex-gear members each comprising a circular cylindrical band of flexible material shaped to include a set of gear teeth for meshing with said inner and outer toothed surfaces, said planetary gear members being located in said annular space and being in contact with said toothed surfaces of said outer and inner gear members, and rotating in said annular space upon rotation of said outer and inner gear members.

2. The gear system of claim 1 wherein said outer gear member, said inner gear member and a predetermined number of said planetary flex-gear members comprise electrically conductive members.

3. The gear system of claim 2 wherein all of said planetary flex-gear members comprise electrically conductive members.

4. The gear system of claim 2 wherein said outer gear member comprises a ring gear including a pair of arcuate ring gear segments mutually separated by a pair of insulation members and said inner gear member comprises four gear segments mutually separated by four insulator members.

5. The gear system of claim 4 wherein said pair of ring gear segments of said outer gear member are of equal arc length.

6. The gear system of claim 4 wherein said four gear segments of said inner gear member are of equal size.

7. The gear system of claim 4 wherein said pair of ring gear segments of said outer gear member comprises semi-circular segments of equal size and wherein said four gear segments of said inner gear member comprises equal sized quadrant segments thereof.

8. A gear system for providing both mechanical and electrical transfer of energy, comprising:
   a first and a second planar set of rotary type gear members rotatable in unison about a common central axis and arranged in mutually parallel planes;
   electrical insulator means located in a plane intermediate said first and second sets of gear members and oriented transverse to said central axis, and
   wherein each of said first and second set of rotary type gear members respectively comprises,
   an outer gear member comprising a ring gear having an inner toothed surface of a predetermined first diameter;
   an inner gear member concentric and substantially coplanar with said outer gear member and having an outer toothed surface of a predetermined second diameter, said first diameter being greater than said second diameter whereby an annular gap is generated on each side of said insulator means between said toothed surfaces; and
   a plurality of planetary flex-gear members comprised of generally circular cylindrical bands of flexible material shaped to include a set of gear teeth located in said annular gap and being in contact with said toothed surfaces of said outer and inner gear members, said planetary flex-gear members rotating in said annular gap upon rotation of said outer and inner gear members.

9. The gear system of claim 8 wherein said outer gear member, said inner gear member and a predetermined number of said planetary flex-gear members comprise electrically conductive gear members.

10. The gear system of claim 8 wherein all of said planetary flex-gear members comprise electrically conductive gear members.

* * * * *